Feb. 23, 1937. H. J. REITER 2,071,575
SPRING FASTENER
Filed June 20, 1935
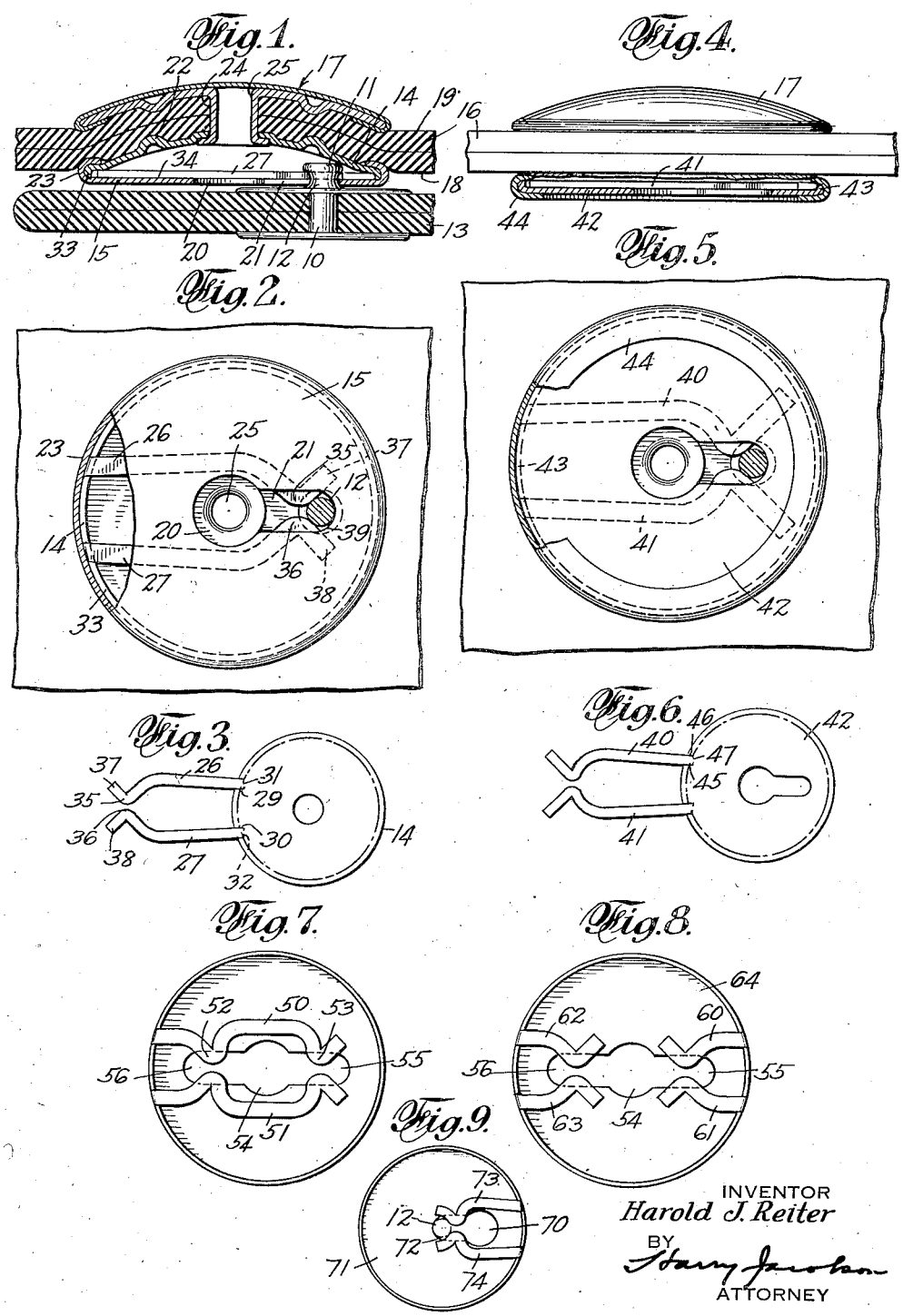
INVENTOR
Harold J. Reiter
BY
Harry Jacobson
ATTORNEY Patented Feb. 23, 1937

2,071,575

UNITED STATES PATENT OFFICE 2,071,575

SPRING FASTENER

Harold J. Reiter, Chicago, Ill.

Application June 20, 1935, Serial No. 27,468

8 Claims. (Cl. 24—224)

This invention relates to fasteners of the snap type, wherein a stud and a cooperating socket are provided, but contemplates the provision of a fastener in which the stud is moved transversely relatively to the socket to lock the stud in place. That is, the stud is moved in a direction perpendicular to the axis of the stud and of the socket, instead of axially.

This invention is an improvement upon that disclosed in my prior co-pending application Serial No. 19,005, filed April 30th, 1935, wherein I have shown a slide fastener in which a stud is inserted through an enlarged part of an opening and then moved transversely in the opening to lock it in place. In my aforementioned co-pending application, one form of the locking means consists of a separate wire spring held in place to a socket part. In the present invention, however, the locking means consists of spring fingers extending integrally from the sheet material of the socket, thereby eliminating the separate spring, and the expense of assembling it in place in the socket.

My invention is particularly applicable to the snap fastener sockets used in connection with studs of the usual type, but contemplates the provision of a socket which adequately locks the stud against removal unless and until the parts are deliberately moved in a predetermined transverse direction.

My invention further contemplates the provision of a snap fastener, having a spring formed integrally with a socket part and which automatically locks itself more firmly when the wearer of the article of apparel to which the fastener is applied, bends, stretches or otherwise puts stress upon the fastener parts.

The various objects of my invention will be clear from the description which follows, and from the drawing, in which Fig. 1 is a vertical section of one form of my new socket as it appears assembled with a cooperating stud.

Fig. 2 is a bottom plan view of the same, partly broken away, to show part of the socket shell with its integral spring members extending therefrom.

Fig. 3 is a top view of the socket shell provided with integral spring members shown in the positions assumed thereby before said members are bent into the operative positions thereof.

Fig. 4 is a vertical section of another form of my invention showing the spring members formed integrally with the socket plate.

Fig. 5 is a bottom plan view of the same, the peripheral flange of the socket shell being partly broken away.

Fig. 6 is a top view of the plate, shown in Figs. 4 and 5 and its integral spring members before said members have been bent into place.

Fig. 7 is a top plan view of a modified form of the socket plate, with integral spring members shaped to form a double action locking spring.

Fig. 8 is a top plan view of another modified form of the socket plate, showing two pairs of integral spring members and a double action stud opening.

Fig. 9 is a top plan view of a modified form of my new socket plate wherein the enlarged stud entrance part of the socket opening is arranged eccentrically of the socket, whereby the stud may be locked into place at the center of the socket.

In the practical embodiment of my invention which I have shown by way of example, the socket proper may be attached to a sheet of any suitable apparel material such as rubber, leather, fabric or the like by means of any of the types of caps customarily used in securing sockets to such sheets. The caps may have any outline such as circular, elliptical or polygonal, though I prefer to so shape the caps as to indicate, by the elongation of the cap, in which direction the stud should be moved to attach to and to detach it from the socket.

My new socket comprises generally, two parts, a plate portion and a shell portion. The plate portion has an opening therein, which opening is in part enlarged, and in part constricted and longitudinally elongated transversely of the socket, to permit the entrance of a suitable stud into the enlarged part by an axial movement. Said movement when succeeded by a transverse movement of the stud into the elongated part of the opening, locks the stud in place.

Associated with the elongated part of the opening is a suitable spring adapted to yield under pressure of the transverse movement of the stud and to snap into engagement with the stud, thereby to lock the stud against unintentional detachment, but to permit the stud to be withdrawn from the socket by an intentional movement in the proper transverse direction succeeded by an axial movement.

The aforementioned spring in one form of my invention extends from and is integral with the plate portion of the socket member. If desired, as shown in another form of my invention, it may extend integrally from the shell portion of the socket.

Referring now to Figs. 1 and 2, I have shown one form of my new socket as used in connection with a stud 10 of the usual type, provided with a head 11 and a neck 12. The stud is secured by the customary means to the piece of material 13, which may be of rubber, leather, fabric or any other material customarily used in garments, shoes, gloves, and other articles of wearing apparel. A detailed description of the stud is therefore deemed unnecessary.

The socket, as distinguished from the socket cap which holds it in place, consists preferably of two parts, as has been hereinbefore mentioned, namely, the socket shell and the socket plate, the plate in any case being provided with a suitably shaped stud entrance opening.

In Figs. 1, 2, and 3, the socket, consisting of the shell 14 and the plate 15, is arranged on one face 18 of the sheet 16 while the cap, designated generally by the numeral 17, is arranged on the other face 19 of the sheet.

As shown, the plate 15 is provided with an opening consisting in part of the central circular stud entrance part 20 which is of greater diameter than that of the head 11 of the stud 10. Extending transversely from the circular opening part 20 is the elongated opening portion 21. Said portion 21 is of less width than the diameter of the stud head 11 but of slightly greater width than the diameter of the stud neck 12.

The openings 20 and 21 together form the stud receiving opening in the socket plate 15 and are shaped in the general form of a key hole.

The socket shell 14 is provided with suitable means such as the projections 22 adapted to be pressed into the sheet for preventing rotation of the socket relatively to the sheet 16. Said shell and plate may, in the form of my new socket now being described, be held together by means of the peripheral flange 23 on the plate, which flange is turned upwardly and inwardly over the peripheral edge of the socket shell. At its center, the shell is provided with a suitable opening as 24 for the reception of the cap eyelet 25 by means of which the socket is held to the underface of the sheet 16.

It will be understood, however, that the socket cap may be otherwise held to the socket shell as by any suitable securing means well known in the art, such as rivets, prongs or the like, shown for example in my said copending application.

Still referring to Figs. 1, 2, and 3, it will be seen that the similar spring members 26 and 27, being integral with the shell, are cut from a sheet of material at the same time that the remainder of the socket shell is cut and formed. The members 26 and 27 are therefore of the same thickness as the material of the remainder of the socket shell 14, but may vary in width considerably throughout the length thereof if desired. It is desirable, however, that at the inner ends of said members, that is, where said members join the shell 14, the members be of sufficient width to permit the bending thereof, through an angle of 180° into the proper operative positions, adjacent and overhanging the key hole opening of the socket plate.

In order to insure the bending of said spring members into the correct positions, I prefer to cut the material of the socket as at 29 and 30 along lines forming continuations of the edges of the spring members to form the respective bending lines 31 and 32 across the members and between the edges thereof.

As shown, an outstanding peripheral flange as 33 is formed on the socket shell to permit the flange 23 to be properly bent, said flange providing a resistance to the clamping of the flange 23 in place. Where such a flange is used, the cuts 29 and 30 may extend past said flange into the remainder of the socket shell. The spring members 26 and 27 may rest upon the inner face 34 of the plate 15, if desired or may be slightly spaced from said plate, but in any case the convex portions 35 and 36 thereof overhang the edges of the opening part 21, for a sufficient distance to obstruct the passage therepast of the neck 12 of the stud. The diverging ends 37, 38 of said spring members are so arranged with respect to the end 39 of the slot part 21 as to lock the stud neck against said slot end 39 in the locked position of the stud.

In that form of my invention shown in Figs. 4, 5, and 6, the spring members 40 and 41 are formed integrally with the socket plate 42 instead of integrally with the socket shell. In this case, a peripheral flange 43 is formed on the shell, said flange being clamped about the plate. If desired, an outstanding flange portion may be formed on the plate to provide sufficient material to permit the proper clamping or pressing of the flange 44 in place. Where such flange 44 is provided on the plate 42, the cuts 45, 46, forming extensions of the edges of the member 40, may extend through the material of said flange and into the remaining inner part of the plate 42 thereby providing the bend line 47 about which the member 40 bends when turned inwardly on to the plate 41 through an angle of 180°. The cuts and bend line for the member 41 being similar to that just described in connection with the member 40, the description thereof need not be repeated.

Referring now to Fig. 7, the spring members 50, 51 are provided with convex bends 52, 53 respectively, corresponding to the bends 35, 36 of the spring members 26, 27. In this form of my invention, the stud entrance opening is made in the form of a double key hole slot being provided with a large inner opening part 54, and transverse narrower extensions 55, 56. The convex locking parts 53 of the spring members are arranged to overhang the opening part 55 while the bends 52 are arranged to overhang the opening part 56. In this form of my invention, the stud, after being inserted into the opening 54, may be moved transversely either into the opening 55 past the locking parts 53 to lock the stud at the extreme right as viewed in Fig. 7, or said stud may be moved into the opening part 56 toward the extreme left to be locked by the spring parts 52.

In Fig. 8, the spring members 60, 61 are integral with and are formed from that part of the shell material nearest the end of the opening part 55, while a corresponding set of spring members 62, 63 are bent from diametrically opposed points on the plate 64.

In the form of my invention shown in Fig. 9, the enlarged portion 70 of the keyhole slot is eccentric of the axis of the plate 71, said opening portion 70 communicating with the transverse extension 72 thereof which terminates a sufficient distance to the left of the center of the plate 71 to permit the stud neck 12 to be properly locked in place by the spring members 73, 74. In this form of my invention, the stud is locked at the center of the plate 71 instead of at one side thereof.

It will be seen that I have provided a fastener socket and installation wherein the locking springs are economically and efficiently made of one piece with a socket part and cooperate with a stud to properly lock the stud against accidental separation from the socket and that I have provided a structure designed for practical use.

While I have shown and described certain specific embodiments of my invention, I do not desire to limit myself thereto, but intend to claim my invention as broadly as may be permitted by the state of the prior art and the scope of the appended claims.

I claim:

1. In a snap fastener, a socket including a plate member having a stud-receiving elongated opening therein, said opening terminating at one end inwardly of the periphery of the plate and having a circular terminal part at the other end arranged at the center of the plate and having parallel edges extending from the circular part to said one end, and a dished shell member having a central circular opening therein and secured to the plate member, and spring means extending integrally from one of said members for engaging and locking a stud in a selected part of the opening against axial retraction therefrom, said spring means yielding on the transverse unlocking movement of the stud relatively to the socket to release the stud and comprising a pair of similar fingers of substantially uniform width and in spaced relation throughout the entire lengths thereof, said fingers being bent from the material of said one of said members at the edge thereof to lie in a plane perpendicular to the axis of the socket, each of said fingers having an inwardly bent portion thereof forming an inwardly convex curve directed toward the inwardly bent portion of the other finger and overhanging one of the parallel edges of said opening.

2. A socket comprising a metal plate member having an opening therein including an enlarged opening portion of sufficient diameter to permit the axial passage of a stud head therethrough, a peripheral flange on said member, a shell member arranged with its peripheral edge part inside the flange and secured in place by said flange, and a pair of elongated yieldable fingers extending from the material of the plate member and having opposed bent portions thereon overhanging the opening to engage and lock a stud moved into the elongated portion of the opening after the stud head has been inserted into the enlarged portion.

3. In a socket, a socket shell member, and a socket plate member having an opening therein, said opening comprising a central circular enlarged portion and a transversely elongated narrower portion having parallel edges and communicating with the enlarged portion, one of said socket members having comparatively wide and thin elongated independent yieldable extensions bent inwardly from the edge of said socket member and lying in a plane at right angles to the axis of the socket, said extensions being each provided with a projection bent transversely and inwardly from the material thereof and arranged to engage and lock a stud moved transversely into the elongated portion of the opening after the stud head has been axially inserted into the enlarged portion, and a peripheral flange on one of said socket members bent about the periphery of the other of said members to secure said socket members together.

4. In a socket having a transversely elongated opening, said opening having an enlarged portion and a constricted portion, a socket member, and a spring formed integrally with and bent from an edge of said member, said spring having an inwardly convex bend intermediate the ends thereof and a projection associated with the constricted portion of the opening and yielding under the pressure of a stud inserted axially through the enlarged portion and moved transversely of the socket into and out of the constricted portion, a cap member, and means for securing said members together and on opposite sides of a sheet of material.

5. A snap fastener comprising a socket including a socket plate member and a socket shell member secured to the plate member, a cap member adapted to be secured to the shell member with a sheet of material therebetween, and a stud adapted to be assembled with and disassembled from the socket by two movements, one of said movements being an axial movement and the other being a transverse movement at right angles to the axial movement, said stud having a neck and a head of greater diameter than the neck, and said socket having an enlarged opening part of greater diameter than the head for the axial passage of the head therethrough, and having a constricted elongated opening part communicating with the enlarged part of the opening and of less width than the diameter of the head and adapted to receive the neck of the stud, and spaced, independent yieldable fingers bent from the material of one of said members, and arranged in the general direction of elongation of said opening for resisting transverse movement of the stud into and out of the constricted portion, said fingers having a pair of constricted bends convex toward each other, said bends inwardly overhanging the edges of the constricted part of the opening.

6. In a socket, a shell member open at one end and having integral spring extensions bent from said member and extending partway across the other end, material-engaging projections on said shell member to resist rotation of the member relatively to the material to which the socket is secured, a plate member having an elongated stud-receiving opening therein and secured to the shell member, said spring extensions having a pair of constricted bends convex toward each other, said bends inwardly overhanging opposed selected parts of the edges of the stud-receiving opening, said extensions having free ends, and a cap having fastener means projecting therefrom and adapted to pass through the open end of the shell member for securing the shell member to the cap with the material therebetween.

7. A socket including a plate member provided with an elongated stud-receiving opening therein including a stud entrance part, and a shell member secured to said plate member and having integral fingers formed of a single piece of material therewith.

8. In a socket, a shell member having stud-engaging spring fingers formed therewith from a single sheet of material, and a plate portion having an elongated stud-receiving opening therein, said opening having an enlarged portion and a transversely elongated narrower portion.

HAROLD J. REITER.